Jan. 26, 1943.   C. H. KÖHN   2,309,603
AUTOMATICALLY LUBRICATED ROLLER CHAINS, RUNNING ON TRACKS
Filed Nov. 14, 1940   3 Sheets-Sheet 1
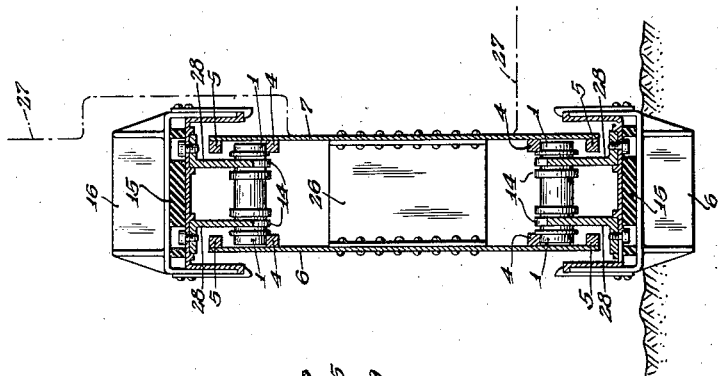
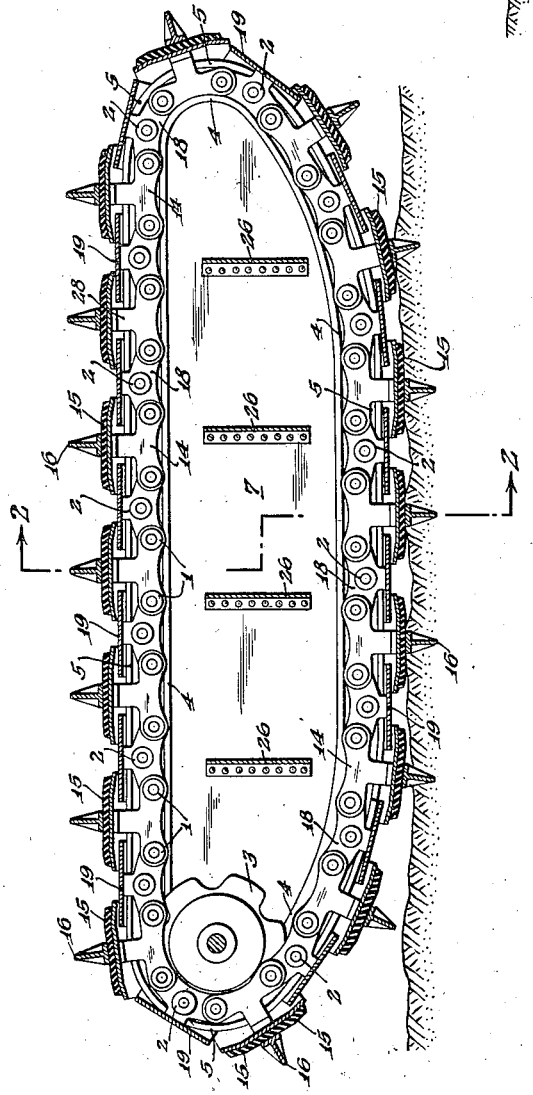
INVENTOR
Claus Hinrich Köhn
BY
ATTORNEY Jan. 26, 1943.   C. H. KÖHN   2,309,603
AUTOMATICALLY LUBRICATED ROLLER CHAINS, RUNNING ON TRACKS
Filed Nov. 14, 1940   3 Sheets-Sheet 3

INVENTOR
Claus Hinrich Köhn
BY
ATTORNEY

Patented Jan. 26, 1943

2,309,603

UNITED STATES PATENT OFFICE 2,309,603

AUTOMATICALLY LUBRICATED ROLLER CHAIN RUNNING ON TRACKS

Claus Hinrich Köhn, Rapperswil, St. Gallen, Switzerland

Application November 14, 1940, Serial No. 365,613
In Switzerland August 25, 1939

3 Claims. (Cl. 74—257)

This invention refers to automatically lubricated roller chains running on tracks arranged on the side of a vehicle.

In particular, the invention relates to roller chains provided with foot plates or other propagating means for tractors, tanks and like vehicles.

It is an object of the invention to render the lubrication of those chains automatic and efficient.

It is another object of the invention to apply the lubricant under pressure to the bearings of the rollers and to the joints of the links of the chain.

It is a further object of the invention to continuously stir and press the lubricant, such as grease, to all the places to be lubricated while the chain is moving, and to derive that stirring action and pressure from the rotating rollers.

Figure 3:
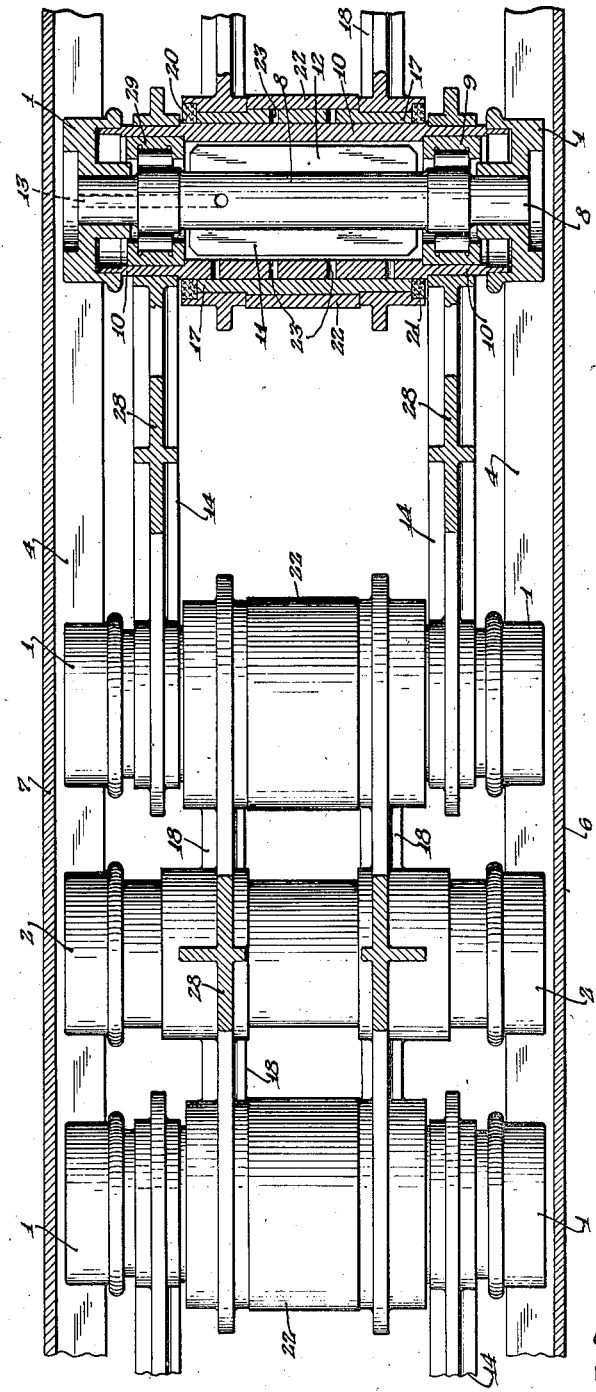
Figure 5:
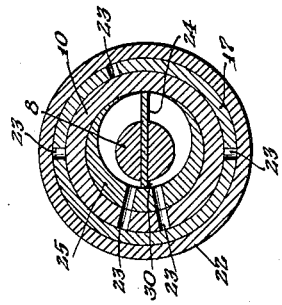
Figure 4:
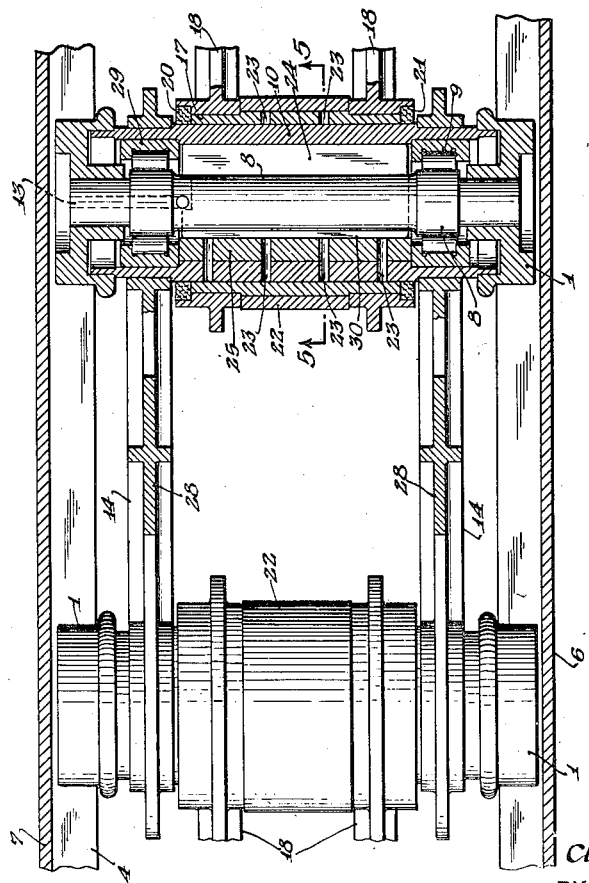

These and other objects of the invention will be more clearly understood when the specification proceeds with reference to the drawings in which Fig. 1 shows a side elevation of a unit comprising tracks and a roller chain with foot plates and grippers or lugs, to be applied to each side of a vehicle, and the front wall omitted, Fig. 2 shows a vertical cross-section along the line 2—2 in Fig. 1, Fig. 3 a plan view of two chain links, without foot plates, gripper and outside tracks, and a cross-section through a joint of the chain, Fig. 4 shows a similar plan view as Fig. 3 of a modification of a joint, and Fig. 5 a cross-section along line 5—5 in Fig. 4.

Referring to Figs. 1 and 2 of the drawings, the roller chain is composed of rollers 1, the axles of which are connected by alternating links 14 and 18. Links 14 connect adjacent axles of rollers 1 and carry foot plates 15 and removable grippers or lugs 16 between the axles. Links 18 are curved outside, connect the axles of adjacent rollers 1 and carry the axles of rollers 2. Tracks 4 and 5 are arranged on the side walls 6 and 7 and form a closed running path for the rollers of the chain. Due to the shape and arrangement of the links as described, rollers 1 will run on the inside tracks 4 and rollers 2 on the outside tracks 5.

The side walls 6 and 7 are rigidly connected by plates or spacers 26 riveted to or otherwise connected with them. Thus a unit is obtained, comprised of the side walls 6, 7 and tracks 4, 4, 5, 5 which can be conveniently attached to the body or chassis of a vehicle as indicated in dotted lines 27 in Fig. 2. Between the pair of tracks 5 space is left for the members 28 rigidly attached, such as screwed, to each pair of links 14 to project outwardly and to rigidly carry a foot plate 15 and gripper or lug 16.

Between the side walls 6, 7 and at one end of the unit formed by them, a toothed wheel 3 is rotatably arranged engaging rings 22 on the axles of rollers 1. Wheel 3 is driven by an engine in the vehicle to which the units are laterally attached. This drive is conventional and therefore not shown.

Referring to Fig. 3, each axle 8, to the ends of which the rollers 1 and 2 are attached, e. g., keyed on, is journaled in bearings comprised of rollers 9 and rings 29 mounted in sleeve 10 and carries radial plates 11 between the bearings 9, 29. Space 12 between the axles 8 and sleeves 10 is filled with a lubricant which is introduced through channel 13 the outer end of which is thereafter closed by a suitable stopper, such as a screw (not shown).

On the sleeves 10 the links 14 are journaled. Shorter sleeves 17 are arranged on sleeves 10 and carry links 18 with foot plates 19; 20 and 21 are ring-shaped washers.

On the sleeves 17 are rotatably mounted rings 22 which are engaged by the teeth of wheel 3.

From the above it will be appreciated that sleeve 10 projects into rollers 1 which can rotate relative to that sleeve, and the latter is journaled to the axle 8 of the rollers 1 by means of roller bearings 9, 29. The pair of links 14 carrying the outer foot plates 15 and grippers (if any) 16, are arranged on the outside and journaled to sleeve 10. The pair of links 18 are also journaled to sleeve 10 inside links 14 and spaced from each other by ring 22 which is to be engaged by the driving wheel. Each pair of links 18 rigidly carries foot plates 19 which bridge over the space between adjacent foot plates 15, both on straight and curved portions of the tracks.

All the gliding surfaces of sleeves 10 and 17 are connected with space 12 through holes or bores 23 which lead to conventional lubrication grooves (not shown).

When the roller chain moves, rollers 1 and 2 and their axles 8 rotate, and the plates 11 stir and press the lubricant in space 12 against the inside wall of sleeve 10 and through apertures 23 into the lubrication grooves and gliding surfaces of the individual sleeves 10 and 17.

The bearings 9, 29 are also sufficiently lubricated through the whirling of the lubricant, especially if the ends of plates 11 are helically bent like a left- or right-threaded transmission spiral around axles 8, whereby part of the lubricant is pressed sideways to the bearings 9.

To intensify the lubrication effect, if desired, the modification shown in Figs. 4 and 5 may be used. There a plate 24 substitutes for sheets 11 rigidly connected to axles 8. Plate 24 is mounted radially slidable in a slit of axles 8 and glidingly engages the eccentric inside surface of piece 25 attached to sleeve 10.

In rotating plate 24, the lubricant is centrifuged in the same way as by rotating sheets 11; part of it is at the same time put under considerable immediate pressure, since plate 24 reciprocates and simultaneously rotates in the eccentric hole of piece 25 and acts like a rotating pump piston which presses the lubricant through the narrow portion 30 between axle 8 and filling piece 25. Through this pressure at the same time a part of the lubricant, such as grease, is injected into apertures 23 lying within the pressure sphere, and sideways to bearings 9, 29.

It is to be understood that the invention is not limited to any exemplification as described above, but to be derived in its broadest aspect from the appended claims.

What we claim is:

1. In a roller chain, joints comprised of an axle rigidly attached to the rollers, a sleeve spacedly surrounding said axle and glidingly engaging said rollers, bearings spaced from each other arranged between said sleeve and said axle, chain links journaled on said sleeve, a pressure member such as a radial plate arranged within said sleeve between said bearings and operatively connected with said axle so as to rotate with it, and holes and lubrication grooves in said sleeve, so that a lubricant introduced in the space between said sleeve, bearings and axle is pressed by said plate to places to be lubricated of said bearings and between said sleeve and links when said rollers and axle revolve relative to said sleeve when the chain is moving.

2. In a roller chain, joints comprised of an axle rigidly attached to the rollers, a sleeve spacedly surrounding said axle and glidingly engaging said rollers, bearings spaced from each other arranged between said sleeve and axle, two pairs of links journaled to said sleeve, a ring to be engaged by a driving toothed wheel journaled on said sleeve and arranged between the links of the inner of said pairs, lubrication grooves on the outside of said sleeve whereon said links and ring are journaled, holes in said sleeve to establish communication between said grooves and the space inside said sleeve between said bearings, a pressure member arranged within said space and operatively connected with said axle so as to rotate with it, and a channel in said axle for introducing a lubricant into said space, so that by rotation of said member when the chain moves, a lubricant is pressed by said members to places to be lubricated of said bearings, sleeve, links and ring.

3. In a roller chain, joints comprised of an axle and rollers rigidly attached thereto, a sleeve spacedly surrounding said axle and glidingly engaging said rollers, bearings spaced from each other arranged between said sleeve and axle, links journaled on said sleeve, said axle provided with a slot between said bearings, said sleeve provided with an eccentric cylindrical inner surface and holes extending from said inner surface to outer surface portions of said sleeve whereon said links are journaled, and a pressure plate movably arranged within said slot and projecting towards said cylindrical surface, so that said plate rotates and reciprocates when said axle rotates and a lubricant is pressed through said holes to places of said sleeve to be lubricated and into said bearings.

CLAUS HINRICH KÖHN.